United States Patent [19]
Ray

[11] 3,884,659
[45] May 20, 1975

[54] FILTER BAG ASSEMBLY FOR PULSE JET COLLECTOR

[75] Inventor: Frank M. Ray, Hoffman Estates, Ill.

[73] Assignee: Flex-Kleen Corporation, Chicago, Ill.

[22] Filed: June 3, 1974

[21] Appl. No.: 475,518

[52] U.S. Cl. .................. 55/379; 55/492; 55/511
[51] Int. Cl. ............................................. B01d 46/02
[58] Field of Search ............ 55/293, 302, 374, 376, 55/377, 341, 378, 379, 492, 511

[56] References Cited
UNITED STATES PATENTS

| 956,862 | 5/1910 | Meyer | 55/293 |
|---|---|---|---|
| 1,079,586 | 11/1913 | Yeomans | 55/293 |
| 2,844,216 | 7/1958 | Swanson | 55/302 X |
| 3,178,868 | 4/1965 | Gibby | 55/302 X |
| 3,377,783 | 4/1968 | Young | 55/302 |
| 3,577,712 | 5/1971 | Ballennie | 55/511 X |
| 3,633,753 | 1/1972 | Petitjean | 55/341 X |
| 3,710,552 | 1/1973 | Genton | 55/341 X |

Primary Examiner—Frank W. Lutter
Assistant Examiner—Kathleen J. Prunner
Attorney, Agent, or Firm—J. Patrick Cagney

[57] ABSTRACT

An improved filter bag assembly for pulse jet dust collectors, the assembly including an open ended sleeve-like filter bag telescopingly fitted over an open ended wire support cage and a metal end cap for closing one end of the filter bag and cage. The end cap is crimped onto the bag end in a double curl lock seam arrangement and is provided with circumferentially spaced detents which provide a mechanical interlock within the bottom end ring of the support cage to center the bag relative to the cage.

3 Claims, 3 Drawing Figures

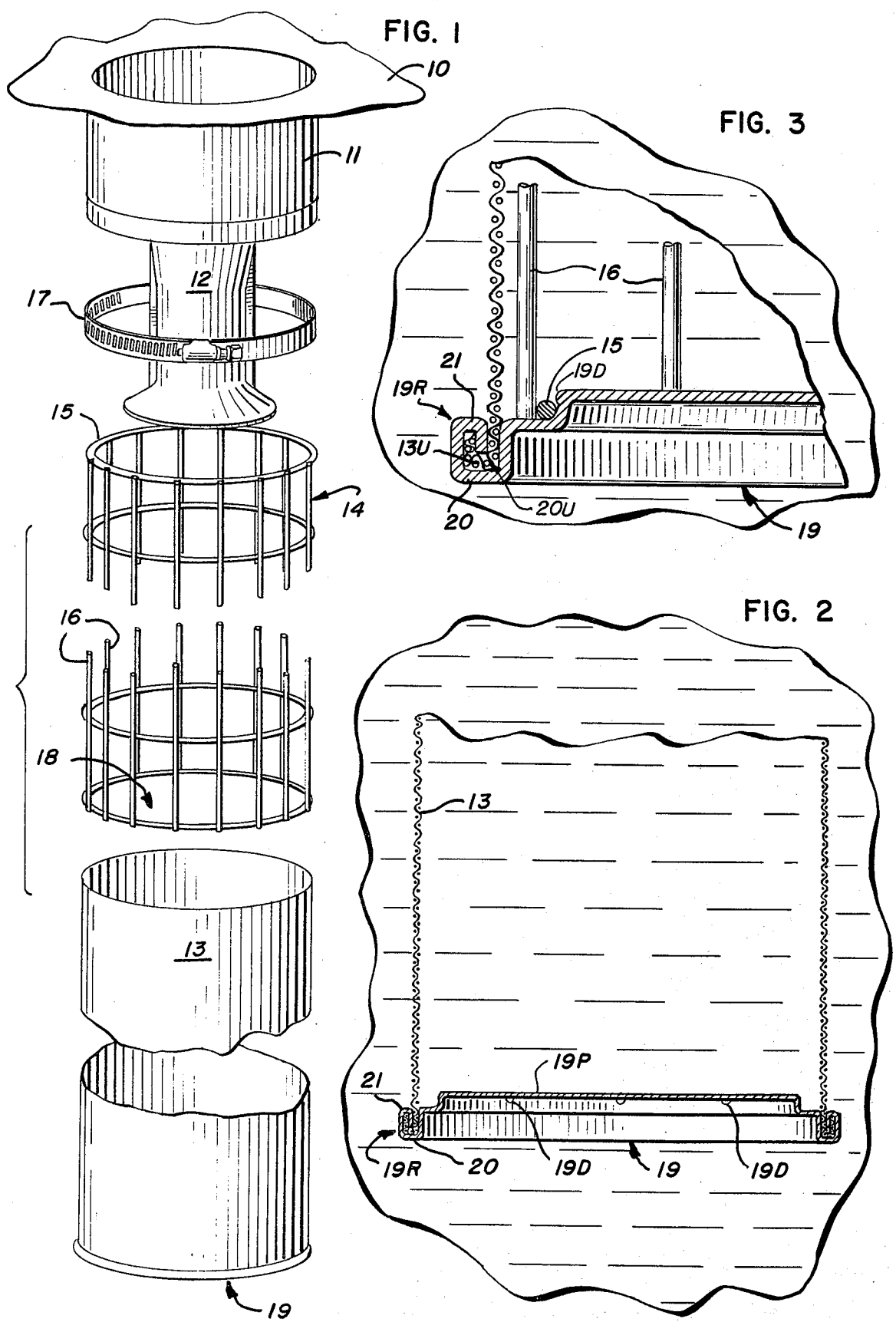

FILTER BAG ASSEMBLY FOR PULSE JET COLLECTOR

BACKGROUND OF THE INVENTION

In pulse jet type dust collectors each filter bag is mounted in slack relation upon a bag cage with both the cage and the bag being supported from a collar.

In conventional practice the filter bag is a sock-shaped element that completely surrounds the bottom end of the cage. The cage and the filter bag are supported from a tube sheet in any suitable fashion, and are fitted with an air nozzle for producing reverse jet air blasts to inflate the bag instantaneously and cause it to snap away from the cage for dislodging accumulated solids from the filter media. The cage is an open wire framework of generally cylindrical form and is conventionally provided with a metal end cap capable of withstanding the wear associated with the jet air blasts.

In this conventional prior art arrangement the filter bag has a fabric end cap stitched along a circular seam to a main fabric sleeve. This bag construction requires a costly stitching operation and is still subject to end cap wear as well as to the possibility of the bag fabric being abraded by the ends of the wire rods that extend the length of the cage.

SUMMARY OF THE INVENTION

The present invention seeks to eliminate the problems described above by providing a bag and cage assembly that is less expensive to manufacture and that provides for a secure mechanical interlock and accurate centering of the bag end relative to the cage end, thus avoiding possible snagging of the fabric.

In accordance with the present invention, a filter bag assembly for a pulse jet type dust collector comprises an elongated generally cylindrical wire cage having an end ring defining an open cage end, an elongated sleeve-like filter bag in slack relation on the cage and having a circumambient bag end portion defining an open end adjacent the end ring, and an end cap for closing the open end of the bag, the cap including a circumambient clamping rim portion in airtight peripheral engagement with the circumambient bag end portion, the end cap having a pilot portion axially offset from the rim portion and projecting into the end ring to center the bag and cage in peripherally spaced relationship.

In the preferred embodiment the metal cap has detent means to create a mechanical friction fit with the end ring and thereby provide positive interlock. The circumambient clamping rim portion of the cap includes a pair of reverse bends defining a double curl lock seam which provides an effective full length edge seal capable of withstanding tension loads of as high as 100 lbs. per inch.

The improved bag and cage assembly of this invention utilizes a metal cap on the bag in place of the fabric cap and the metal cap on the cage of the prior art. The assembly and clamping of the metal cap to the bag may be effected more efficiently than the stitching of the fabric cap to the bag so that manufacturing costs are reduced.

Other features and advantages of the invention will be apparent from the following description and claims and are illustrated in the accompanying drawings which show structure embodying preferred features of the present invention and the principles thereof, and what is now considered to be the best mode in which to apply these principles.

DESCRIPTION OF THE DRAWINGS

In the accompanying drawings forming a part of the specification, and in which like numerals are employed to designate like parts throughout the same:

FIG. 1 is an exploded perspective view illustrating a bag and cage assembly in association with a conventional bag cup and gas nozzle for a pulse jet type dust collector.

FIG. 2 is a fragmentary lengthwise sectional view through the bottom end of the improved bag showing the metal bag cap and FIG. 3 is an enlarged fragmentary section showing the bag with the metal bag cap assembled in the end ring of the cage.

DESCRIPTION OF THE PREFERRED EMBODIMENT

Referring now to the drawings, and particularly to FIG. 1, a portion of a perforated tube sheet as shown at 10 includes a conventional collar 11 which is fitted with a gas nozzle member 12. An improved sleeve-like filter bag in accordance with this invention is shown at 13 in association with a modified wire cage 14 that consists of a set of wire rings 15 interconnected by a set of circumferentially spaced lengthwise extending wire rods 16 that are secured to the external periphery of the rings. The bag 13 may be of any conventional porous flexible filter media.

In the typical installation the bag 13 is telescoped in slack relation over the cage 14 and the upper ends of the bag and cage are clamped onto the exterior of the collar 11 by means of a clamping ring 17. To effect periodic cleaning of the bag, automatically timed reverse jet air blasts are directed downwardly from the nozzle 12 to inflate the bag and cause it to snap outwardly away from the cage. The axially directed jet air blasts impinge on the bottom axial end of the bag and cage assembly and would produce objectionable wear at that location if a fabric end were exposed to the jets.

Whereas in the prior art a metal end cap was applied to the bottom end ring 15 of the cage, the present invention utilizes an arrangement wherein the end of the cage is open as shown by the arrow 18 and the bag is provided with a metal end cap 19 in place of the usual fabric end cap that was stitched on the end of the bag sleeve.

As is best seen in FIGS. 2 and 3, the end cap 19 has a circumambient rim portion 19R that includes a reverse bend portion 20 intermediate the pilot portion 19P and reverse bend portion 21 and merging with the marginal reverse bend portion 21 to define a U-shaped groove 20U that is best seen in FIG. 3 and, that contains a U-shaped circumambient bag end portion 13U. Thus, in the preferred practice, the end cap is crimped onto the bag end in a double curl lock seam arrangement such as is used in tin can constructions. This provides a more secure and airtight joint and allows for high-speed, low-cost assembly. The double curl lock seam joint for a filter bag reliably withstands a load of 100 lbs. per lineal inch without pull-out.

The pilot portion 19P provides for mechanical friction fit within the bottom end ring to act as a locating boss or centering guide that centers the cap relative to the cage, thereby insuring a predetermined peripheral clearance between the ends of the cage rods 16 and the bag. The centered relationship prevents snagging of the bag on the rod ends, a common problem in the prior art. The pilot portion 19P is axially offset from the periphery of the end cap. In the preferred embodiment illustrated herein, the pilot portion has a set of circumferentially spaced detents 19D that provide a positive mechanical interlock with the bottom end ring. The interlock maintains the parts against accidental separation while allowing removal of the bag for replacement.

Thus, while preferred constructional features of the invention are embodied in the structure illustrated herein, it is to be understood that changes and variations may be made by those skilled in the art without departing from the spirit and scope of the appended claims.

What is claimed is:

1. A freely suspended filter bag assembly for a pulse jet type dust collector comprising an elongated, generally cylindrical wire cage having an end ring defining an open cage end, an elongated sleeve-like bag of porous flexible filter media disposed in slack telescoping relation along said cage and having a circumambient bag end portion defining an open end adjacent said end ring and a metal end cap for closing said open end of the bag and including a circumambient clamping rim portion in airtight peripheral engagement with the circumambient bag end portion, said end cap having a pilot portion axially offset from said rim portion and projecting into said end ring in mechanically interlocked relation with said end ring to center and hold the circumambient bag end portion and said end ring of the cage in peripherally spaced apart relationship.

2. A filter bag assembly as defined in claim 1 wherein said clamping rim portion has a reverse bend portion intermediate said pilot portion and a marginal reverse bend portion said intermediate reverse bend portion merging with said marginal reverse bend portion so as to define a U-shaped circumambient groove that contains a U-shaped bag end portion to define a double curl lock seam joint between the bag and cap.

3. A filter bag assembly as defined in claim 1 wherein the axially offset pilot portion includes a set of circumferentially spaced detents for positive mechanical interlock with said end ring.

* * * * *